Dec. 5, 1950          L. W. CURRIER, JR          2,532,894
COOKING MACHINE

Filed May 15, 1947          6 Sheets-Sheet 1

Inventor:
Leslie W. Currier Jr.
By Emery Booth Townsend Miller & Weidner Attys.

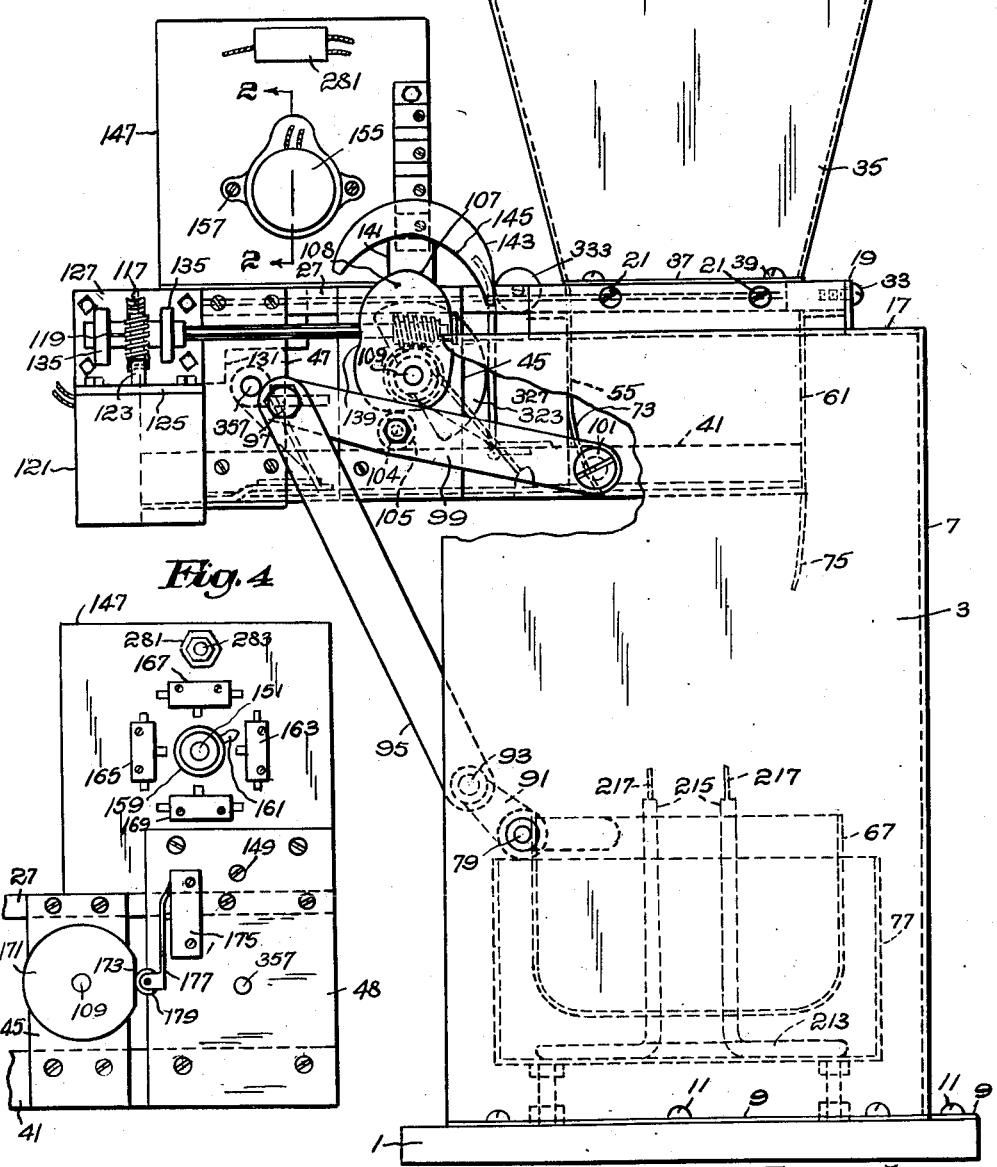

Dec. 5, 1950  L. W. CURRIER, JR  2,532,894
COOKING MACHINE
Filed May 15, 1947  6 Sheets-Sheet 3
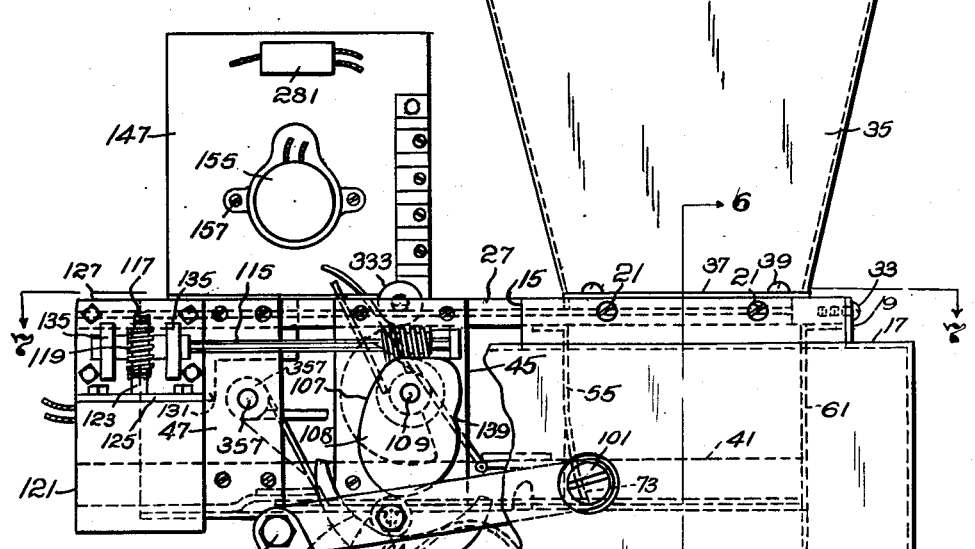
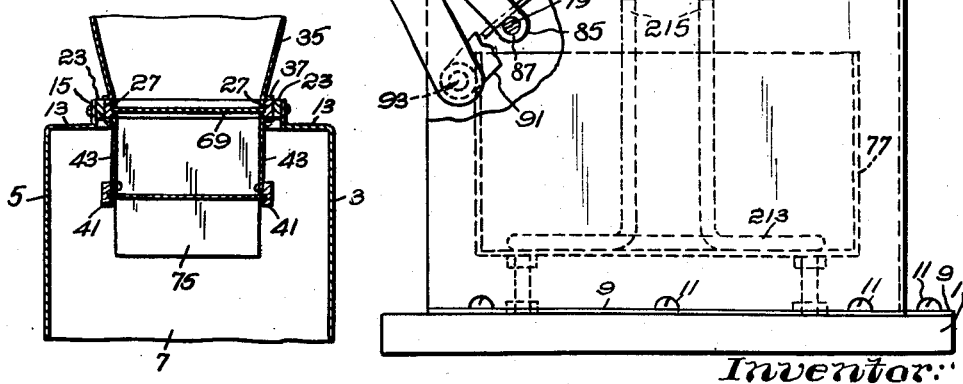
Inventor:
Leslie W. Currier, Jr Dec. 5, 1950 L. W. CURRIER, JR 2,532,894
COOKING MACHINE
Filed May 15, 1947 6 Sheets-Sheet 4
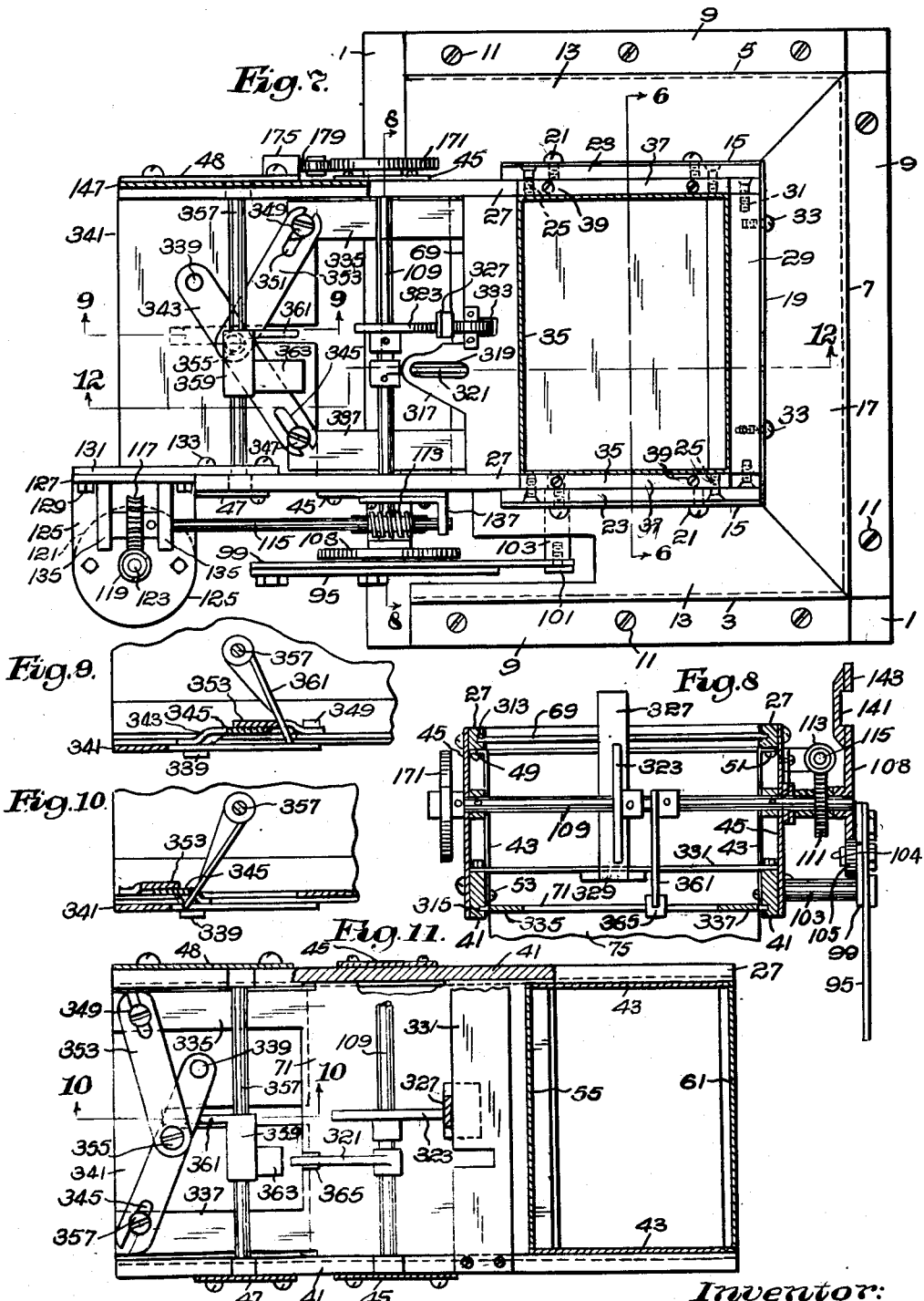
Inventor:
Leslie W. Currier Jr.
by Emery Booth Townsend Miller & Weidner Attys Dec. 5, 1950  L. W. CURRIER, JR  2,532,894
COOKING MACHINE
Filed May 15, 1947  6 Sheets-Sheet 5
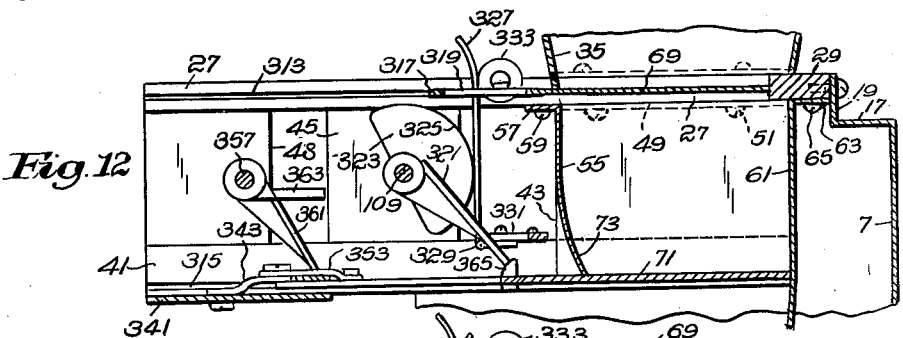
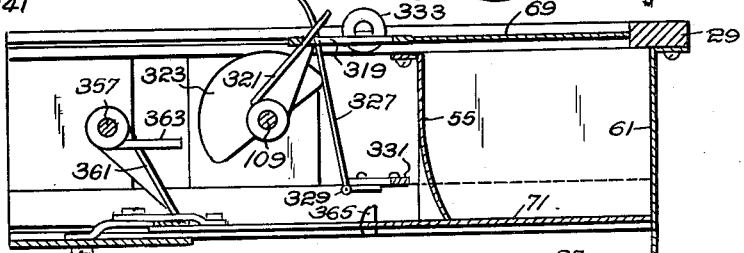
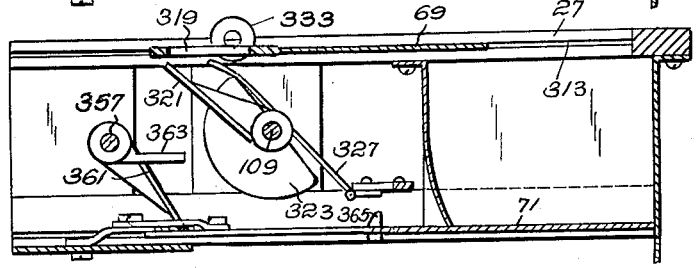
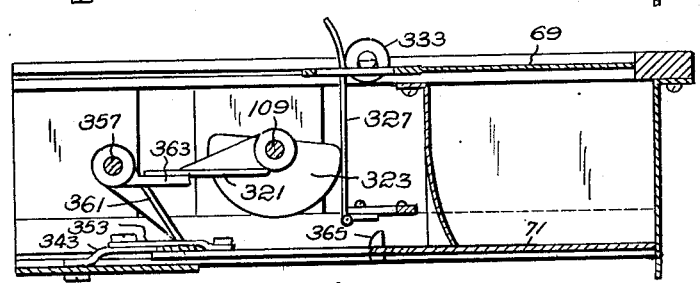
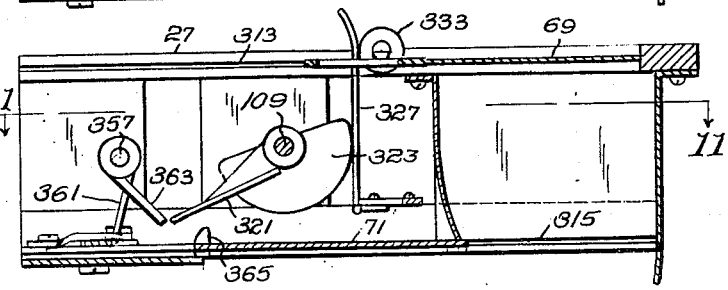
Inventor:
Leslie W. Currier Jr.
By Emery Booth Townsend Miller & Weidner Attys

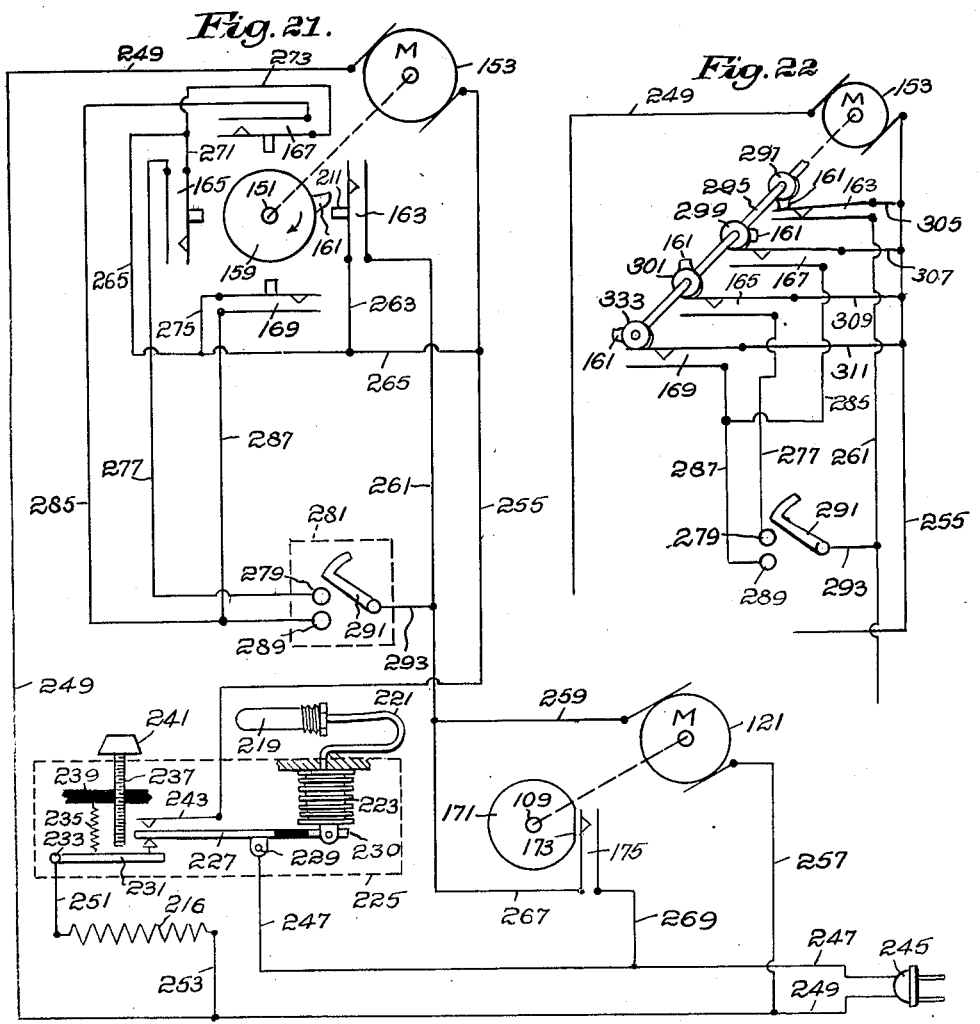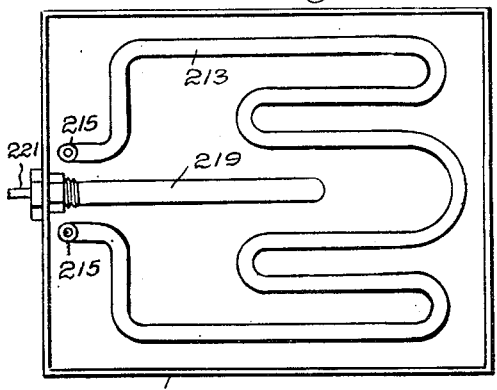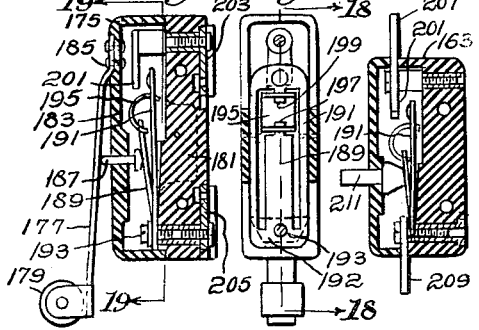

Patented Dec. 5, 1950

2,532,894

UNITED STATES PATENT OFFICE 2,532,894

COOKING MACHINE

Leslie W. Currier, Jr., Kingston, N. H.

Application May 15, 1947, Serial No. 748,315

20 Claims. (Cl. 99—407)

My invention relates to cooking machines, particularly but not exclusively to one adapted for cooking nuts.

The invention has among its objects a cooking machine having provision for entering and removing the articles to be cooked into and from the cooking medium at substantially regular intervals, a further object being the provision of operator controlled means for selectively varying the duration of such intervals so as selectively to vary the time the articles are cooked. These and other objects of the invention will be best understood from the following description when read in the light of the accompanying drawings, while the scope of the invention will be more particularly pointed out in the appended claims.

In the drawings—

Fig. 3 is a side elevation of the machine according to Fig. 1, as viewed from the left, with parts broken away;

Fig. 4 is an elevation of the panel and adjacent parts as viewed from the right of Fig. 1;

Fig. 5 is an elevation, corresponding to Fig. 3, with the parts in a different operative position;

Fig. 6 is a section on the line 6—6 of Fig. 7 on a reduced scale with parts omitted, this section line also being shown on Fig. 5 for convenience in following the drawings;

Fig. 7 is a section on the line 7—7 of Fig. 5;

Figures 1, 2:
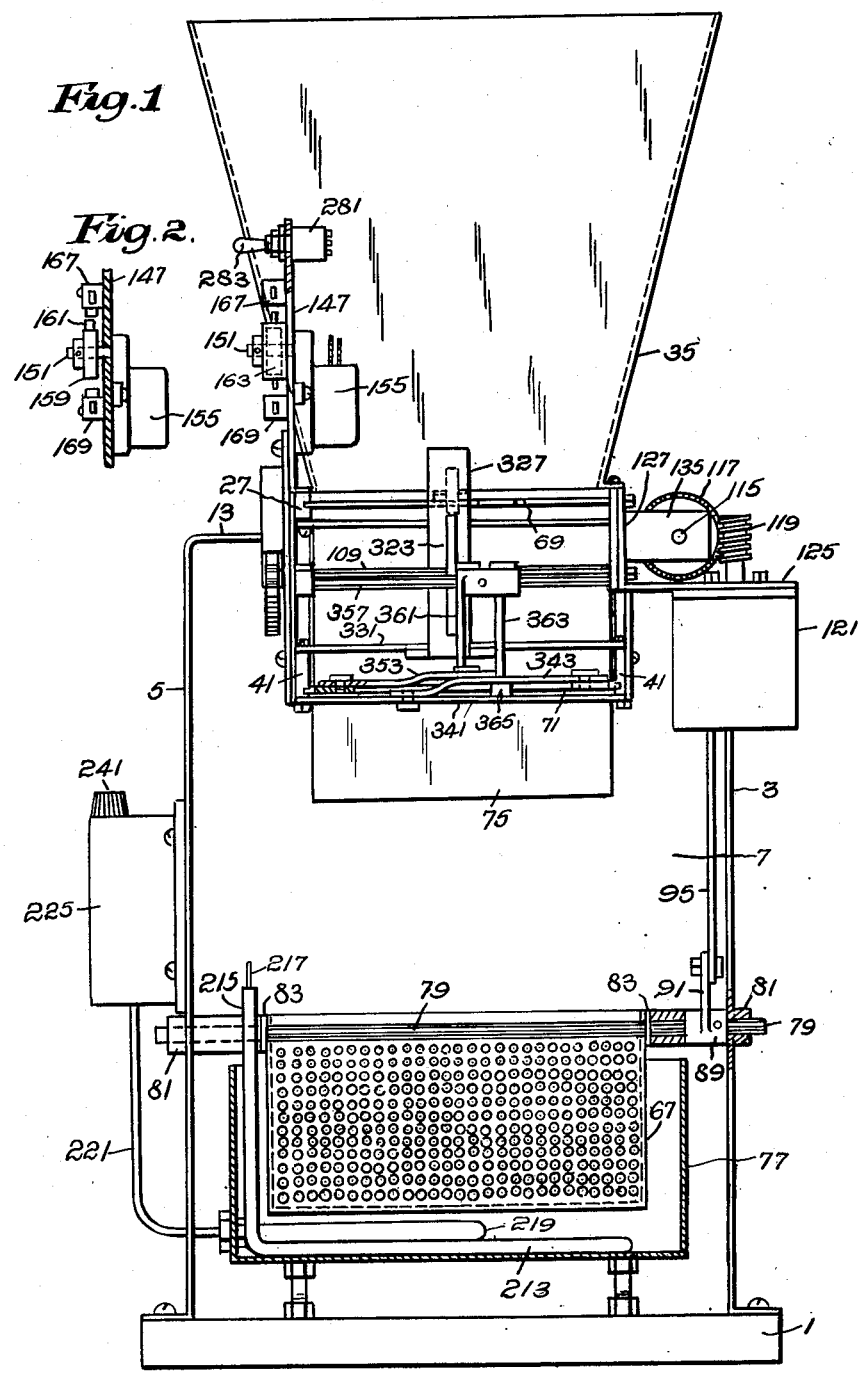
Fig. 1 is a front elevation of a machine according to the invention.
Fig. 2 is a section on the line 2—2 of Fig. 3.

Figs. 8 and 9 are, respectively, sections on the line 8—8 and 9—9 of Fig. 7, with parts omitted;

Fig. 10 is a section on the line 10—10 of Fig. 11, with parts omitted;

Fig. 11 is a section on the line 11—11 of Fig. 16 with parts omitted and parts broken away, Fig. 11 corresponding to a fragment of Fig. 7 with parts in a different operative position;

Fig. 12 is a section on the line 12—12 of Fig. 7, with parts omitted and parts broken away;

Figs. 13, 14, 15 and 16 are sections corresponding to Fig. 12, each showing the parts in a different operative position;

Fig. 17 is a plan of the cooking oil container and associated parts;

Fig. 18 is a longitudinal section of the motor holding switch on the line 18—18 of Fig. 19;

Fig. 19 is a section on the line 19—19 of Fig. 18;

Fig. 20 is a longitudinal section, corresponding to Fig. 18, of one of the four like switches of the timing device;

Fig. 21 is a schematic wiring diagram; and

Fig. 22 is a fragment of a schematic wiring diagram, corresponding to Fig. 21, showing a modified form of timing device.

Referring to the drawings, the machine illustrated comprises a base 1 which supports a box-like standard having the opposite vertical side walls 3 and 5 and vertical back wall 7, the side of the standard opposite the wall 7 being open. At their lower ends the walls 3, 5 and 7 are provided with flanges 9 resting upon the base and secured thereto by screws 11. At their upper edges the walls 3 and 5 are each bent to form a horizontal inwardly extending portion 13 terminating in an upwardly extending flange 15 (Figs. 6 and 7). Similarly the back wall 7 at its upper edge is bent to form a horizontal inwardly extending portion 17 terminating in an upwardly extending flange 19.

To the inner side of each of the flanges 15 of the standard just described is secured by means of screws 21 a horizontal bar 23 (Figs. 6 and 7), and to the inner side of each of these bars is secured by means of screws 25 the end portion of an elongated horizontal bar 27, the two bars 27 thus provided projecting in spaced relation to each other horizontally beyond the open vertical side of the standard. As shown, a horizontal bar 29 (Figs. 7 and 12) is positioned between the right hand ends of the bars 27 as viewed in Fig. 7, this bar 29 being secured to the bars 27 by screws 31. The vertical flange 19 at the top of the standard overlies the outer side of the bar 29 and is secured thereto by screws 33.

As shown, above the standard of the machine is positioned a hopper 35 for the articles, such as nuts, to be cooked, this hopper having an open upper end through which the articles may be entered into it. As illustrated in Figs. 5, 6 and 7, this hopper at two of its opposite sides at its lower edge is provided with an outturned horizontal flange 37, each of which rests upon the adjacent bar 27 and is secured thereto by screws 39.

Below each of the elongated horizontal bars 27 is positioned an elongated horizontal bar 41, the latter being suspended from the bars 27 by plates 43, 45, 47 and 48 (Figs. 7, 8, 11 and 12). As shown in Fig. 8, each of the plates 43 at its upper edge portion has an outturned flange 49 secured to the under side of the adjacent bar 27 by screws 51. At its lower edge portion each plate 43 rests against the inner side of the adjacent bar 41 to which it is secured by screws 53. The plates 43 are of width approximating the corresponding dimension of the hopper, and extending between said plates adjacent one pair of their opposite vertical edges is a plate 55 (Figs. 11 and 12) having at its upper edge an outturned laterally projecting flange 57 secured at each of opposite ends to the adjacent bar 27 by a screw 59. Extending between the other pair of vertical edges of the plates 43 is a plate 61 having an outturned flange 63 secured to the under side of the bar 29 by screws 65.

As clearly indicated by Figs. 11 and 12, the two plates 43 and plates 55 and 61 form a box-like chamber or chute. This chamber serves as a measuring chamber for the articles to be charged to the basket 67 of the machine. Entrance of the articles to the chamber from the hopper is controlled by the sliding inlet valve 69 (Figs. 11 and 12), and exit of the articles from the chamber to the basket is controlled by the sliding outlet valve 71, these valves being alternately opened and closed for filling the measuring chamber with the articles and afterward discharging them therefrom to the basket. For properly directing the articles discharged, the lower end 73 of the plate 55 and the lower end 75 of the plate 61 are shown as curved toward each other (see Fig. 3), the plate 61 being preferably long enough in a vertical direction to position it as close as possible to the basket.

The basket 67, above referred to, is adapted to be received in a container 77 for the hot liquid, such as cooking oil or fat, in which the articles are cooked. The basket is tiltably mounted so that it can be moved at the end of each cooking operation from its position in the container shown by Fig. 3 to its position shown in Fig. 5, in which latter position the contents of the basket are dumped. As shown, the basket is made of foraminous sheet material so that the hot cooking liquid will enter it for cooking the articles contained therein, and so that such liquid will readily drain from the basket when the basket is raised from the liquid.

As shown, the basket is fixedly secured adjacent one lateral edge to a rock shaft 79 journalled adjacent its opposite ends in bearings 81 carried by the vertical sides 3 and 5 of the standard. For securing the basket to the shaft a clip 83 is brazed to the adjacent portion of each end wall of the basket, the projecting end 85 (Fig. 5) of each clip having an opening 87 through which the shaft passes, this projecting portion being brazed to the shaft.

For rocking the basket carrying shaft 79, fixedly secured thereto is the hub portion 89 (Fig. 1) of a crank arm 91, through which portion the shaft extends. Pivotally connected to the end of the crank arm at 93 is the end of a link 95 (Figs. 3, 5 and 7), the opposite end of the link being pivotally connected at 97 to one end of a rock arm 99, the opposite end of which latter is pivotally connected at 101 to the end of a post 103 (Figs. 7 and 8) rigidly carried by and laterally projecting from the adjacent bar 41. For rocking the arm 99 the same is shown as provided intermediate its length with a laterally projecting pin 104 carrying a roller 105, the latter cooperating with the peripheral cam surface 107 of a rotary cam 108. As shown, this cam is carried by a horizontal shaft 109 which, as best shown in Fig. 8, is journalled adjacent opposite ends in the two oppositely positioned plates 45. For rotating this shaft the same is shown as provided with a wormwheel 111 fixedly carried thereby. With this wormwheel meshes a worm 113 (see Figs. 7 and 8) fixedly carried adjacent one end of a rotary shaft 115. At its opposite end the last mentioned shaft fixedly carries a wormwheel 117 which meshes with a worm 119 driven by an electric motor 121, the worm being fixedly carried by the upper end portion of the vertical motor shaft 123. As shown, the motor 121 is carried by a bracket having a horizontal web 125 and a vertically extending base portion 127, the latter being secured by bolts 129 to a plate 131 (Figs. 3 and 7) secured by screws 133 to the adjacent bar 27. The shaft 115, as shown, is journalled at one end in lugs 135 formed integrally with the bracket 125, 127, and at its opposite end in a bracket 137 carried by the outer side of the adjacent plate 45.

The two sets of worms and wormwheels above described connecting the power motor shaft 123 to the cam shaft 109 form a reduction gear for rotating the cam shaft at a much reduced speed as compared to the speed of the motor. The cam surface 107 is so shaped that in one revolution of the shaft 109 the basket will be moved from its position shown in Fig. 3 to its position shown in Fig. 5 and returned to its position shown by Fig. 3. Preferably, the cam surface is formed to present a concave portion 139 so as to give the basket a "dwell" when it is initially raised from the container and is still above it, in this way to permit the cooking liquid to drain from in contact with the cooked articles back into the container.

It will be observed that in the position of parts shown by Fig. 3 the weight of the basket holds the roller 105 on the rock arm 99 in contact with the cam surface 107 of the cam 108, and that when the basket is tilted into its position shown by Fig. 5 the weight of the basket tends to move the roller away from that cam surface. To prevent this latter movement, and to avoid the use of troublesome springs for maintaining contact between the roller and cam surface at all times, the cam is preferably integrally provided at one side thereof with an outward radially extending arm 141 (Figs. 3 and 8), this arm integrally carrying a part 143 having a concave side forming a cam surface 145 facing the cam surface 107. In the position of parts shown by Fig. 5, and in adjacent positions, this cam surface of the part 143 holds the roller in contact with the peripheral cam surface 107 of the cam 108, and in fact itself acts as a cam as the roller tends to bear on it rather than on the cam surface 107.

In the present embodiment of the invention the power motor 121 is normally stationary, and is operated at the end of each cooking operation to cause the basket and the valves 69 and 71 to move through their cycles of movement. For causing such intermittent operation of the motor, a timing device is provided. In the present embodiment of the invention this timing device is mounted upon a vertical panel 147 the lower end of which rests upon the upper surface of the bar 27 at the rearward side of the machine and is secured by screws 149 to the adjacent plate 48, which latter, for that purpose, extends upwardly above the bar as shown in Fig. 4. The timing device comprises a normally continuously rotating shaft 151 (Figs. 1, 2 and 4) driven by a synchronous motor 153 (schematically shown in Fig. 21) contained in a casing 155 secured to the panel by screws 157. This motor, which is connected to the shaft 151 by a reduction gear also contained in the casing, in effect constitutes in conjunction with such gear a clockwork. The unit comprising the motor and reduction gear may be of the well known type employed in electric clocks driven by alternating current, and therefore need not be further described.

Fixedly mounted upon the timing shaft 151, so as to rotate therewith, is a disk 159 (Figs. 2 and 4) provided with a radially projecting finger or cam 161. This cam as it is rotated by the shaft 151 at constant speed, operates at regular intervals a switch means for controlling a circuit which causes operation of the power motor 121. This switch means, if an invariable cooking time of the articles is employed, may comprise a single control switch 163, or, if a selectively variable cooking time is employed, may comprise that switch and the additional control switches 165, 167 and 169. It will be understood that the cooking time employed for the articles is considerably longer than the time it takes to move the basket through its cycle. For example, the cooking time may be about 6 minutes, while it may take, for example, 30 seconds to move the basket through its cycle. As the timing motor normally operates at substantially constant speed, and this may not be true of the power motor 121 for moving the basket, the control means for the power motor is preferably such that the timing device causes initiation of its operation and the motor itself operates a switch for discontinuing its operation when the basket is moved through its cycle. For this purpose the shaft 109 driven by the power motor is shown as having fixed thereto a cam disk 171 provided with a flattened portion 173 (Fig. 4). This cam disk actuates a motor holding switch 175 having an operating lever 177 at the end of which is mounted a roller 179 cooperating with the cam disk. When the parts are in the position shown by Fig. 4 the switch 175 is open. When the timing device initiates operation of the power motor by closing the power motor circuit to connect such motor across the line, the shaft 109 is rotated to cause the roller 179 to move off the flat portion 173 of the cam disk so as to swing the lever 177 to the right, as viewed in Fig. 4, and in this way close the holding switch. Closure of the holding switch connects the power motor across the line 20 by a circuit in parallel with the circuit controlled by the timing device, so that when the timing switch opens after having initiated operation of the power motor the latter then remains exclusively under the control of the holding switch. When the motor drives the shaft 109 through one revolution the cam disk 171 returns to its position shown by Fig. 4 and the holding switch opens to discontinue operation of the power motor.

The motor holding switch 175, as shown in Figs. 18 and 19, may comprise a base portion 181 and cover portion 183 both formed of insulating material. The lever 177, as shown, is in the form of a flat spring fixedly secured at one end 185 to the cover. Coacting with this lever is a push-button 187 extending through the cover and bearing against the leaf spring 189 for operating the contact leaf spring 191. These two last mentioned springs, as shown, are integrally formed as one piece presenting a base portion 192 fixedly secured by a screw 193 to the base portion of the switch. As shown, the free end portion of the spring 189 is connected to the free end portion of the contact spring 191 by a curved member 195 of flat spring stock, the spring 189 and contact spring 191 for this purpose having lugs 197 and 199 respectively extending through perforations in the ends of the spring member 195.

When the roller 179 is depressed by the cam disk 171 to move the lever 177 to the right, as viewed in Fig. 18, the push-button 187 will be pressed inwardly by the lever correspondingly to flex the leaf spring 189 and thus move the lower end of the curved spring member 195 to the right. This compresses the spring member 195 radially, and when its lower end passes a dead center position in which that end is vertically below its upper end, as viewed in Fig. 18, the contact spring 191 will snap to the left to cause its free end to bear against the stationary switch contact 201. When the flat portion 173 of the cam disk 171 again moves opposite the roller 179 the lever 177 will move to the left, as viewed in Fig. 18, to permit corresponding movement of the push-button 187 so as to cause the leaf spring 189 to move to the left to cause the parts of the switch to snap back into their position shown by Fig. 18. As shown, the switch 175 is provided with a terminal 203 in electrical communication with the contact 201 and with a second terminal 205 in electrical communication with the spring metal part forming the leaf spring 189 and contact spring 191.

The switches 163, 165, 167 and 169 of the timing device are each provided with terminals 207 and 209 (Fig. 20) and are each directly operated by a push-button 211 acted upon by the cam 161 of the timing device. As shown, the terminal 207 is in electrical communication with the stationary contact 201 with which cooperates the contact spring 191, while the terminal 209 is in electrical communication with the spring metal part forming said contact spring and leaf spring 189, the construction of the switch other than as just mentioned being, except for size, identical with that of the holding switch above described.

As shown, the cooking oil in the container 71 is heated by a resistance heating element 213 submerged in such oil, the body of which element lies on the bottom of the container and has upstanding end portions 215 projecting above the top of the container adjacent one of its lateral walls. This resistance element may be of a well known type consisting of a copper or other metal tube containing an elongated resistance heating coil, the latter being diagrammatically indicated at 216 in Fig. 21 and having terminals 217 (Fig. 3) projecting beyond the two ends of the tube.

Suitable thermostatic means may be provided for controlling the temperature of the cooking oil. As shown in Figs. 1 and 17, and diagrammatically in Fig. 21, this thermostatic means may comprise a bulb 219 containing a volatile or heat expansible liquid, which bulb is submerged in the cooking oil and is connected by a fine bore tube 221 to a bellows 223 (Fig. 21) for operating the control switch for the heating coil, the bellows and control switch being contained in a casing 225 (Fig. 1) carried by the vertical side wall 5 of the standard of the machine. As diagrammatically shown in Fig. 21, the thermostatically controlled switch comprises a lever 227 pivoted intermediate its length at 229 for swinging movement, the free end 230 of the lever being operatively connected to the lower movable end of the bellows. As the oil heats up in the cooking container the bellows 223 expands, due to the increased pressure therein, to move the end 230 of the lever downwardly, which causes its opposite free end to move upwardly. Cooperating with the last mentioned end of the lever is shown a contact lever 231 pivotally mounted at one end 233 for swinging movement. As the free end of the lever 227 moves upwardly the contact lever 231 will swing with it under the influence of the spring 235 until the lever 231 bears against the lower end of an adjustable stop 237, whereupon further upward movement of the lever 231 will cease, and further upward movement of the free end of the lever 227 will cause the contact between the two levers to be interrupted. The stop 237, as shown, is in the form of a screw screwthreaded through an insulating support 239 forming part of the thermostatic switch device. Conveniently this screw extends to the exterior of the casing 225, and its exterior end is provided with a knob 241 so that the screw may be rotated for adjusting the position of the stop presented by its lower end.

For preventing operation of the power motor when the heater is first energized and the cooking oil is cold the thermostatic device preferably also is arranged to control one or the other, or both, of the circuits for the two motors. As shown, the thermostatic device, for this purpose, is provided with a spring switch arm 243 (Fig. 21) which is contacted by the lever 227 after the left hand free end of the latter, as viewed in Fig. 21, moves upwardly a short distance but before the contact lever 231 bears against the stop presented by the lower end of the screw 237. In this way the basket can be automatically charged and operated only when the cooking oil is at or above a predetermined temperature.

The wiring diagram for the machine is schematically shown by Fig. 21. Inserting the plug 245 into an outlet socket in the lighting system of the building will connect the leads 247 and 249 to the opposite sides of the line so that these leads in effect then constitute such sides. This will connect the heating coil 216 across the line from the lead 247 through the lever 227, lever 231 and lead 251 to one terminal of the heating coil, and from the lead 249 to the opposite terminal of the coil through the lead 253. When the cooking oil heats up sufficiently to cause the lever 227 to contact with the switch arm 243 the timing motor 153 will be connected across the line from the lead 247 through the lever 227, switch arm 243 and lead 255 to one terminal of this motor, the opposite terminal of which motor is connected to the lead 249 constituting the other side of the line. This will set the timing motor in operation to cause it continuously to rotate the disk 159 in the direction of the arrow shown in Fig. 21. When the cam finger 161 strikes and depresses the push-button 211 of the timing switch 163 it will close that switch and connect the power motor 121 across the line from the lead 249 by way of the lead 257 to one terminal of that motor, and from its opposite terminal through the lead 259, lead 261, switch 163, lead 263, lead 265, lead 255, switch arm 243 and lever 227 to the lead 247. Connecting the power motor across the line will cause it to rotate and close the switch 175. This closure of the switch 175 will connect the power motor across the line from the lead 249 through the lead 257 to one terminal of that motor, and from its opposite terminal through the lead 259, lead 267, switch 175 and lead 269 to the lead 247. The holding switch 175 remains closed after the timing switch 163 again opens and until the basket has moved through its cycle, whereupon opening of the switch 175 causes all motion of the basket to cease until the cam finger 161 of the timer again closes the switch 163.

So as to be able to vary the cooking time, means are preferably provided under the control of the operator for varying the duration between initiations of operations of the power motor. To this end the timing device is preferably provided with the additional switches 165, 167 and 169, the push-buttons 211 of these switches and of the switch 163, as shown, being arranged in quartering relation to each other. As shown, one terminal of each of these additional switches, like one terminal of the switch 163, is connected to the lead 265, the switch 165 being so connected by a lead 271, the switch 167 by a lead 273, and the switch 169 by a lead 275. The other terminal of the switch 165 is connected by a lead 277 to one contact point 279 of a manually operated selector switch 281 mounted upon the panel 147 and having an operating hand 283. The other two terminals of the switches 167 and 169 are connected in parallel by the joined leads 285 and 287 to the other contact point 289 of the selector switch. The movable contact 291 of the selector switch is connected by a lead 293 to the lead 261 extending to the switch 163. This movable contact of the selector switch is constructed to contact either the contact point 279 or both that contact point and the contact point 289. When it contacts only the point 279 not only will the switch 163 be in circuit but also the switch 165, the latter two being then in parallel so that initiation of operation of the power motor will be established not only when the timer closes the switch 163 but also when it closes the switch 165, which means that if initiation of operation of the power motor is established, for example, every 6 minutes when only the switch 163 is connected in circuit, it will be established every 3 minutes if both that switch and the switch 165 are connected in circuit in parallel by the selector switch. When the movable contact 291 is moved to contact with the contact point 289 as well as the contact point 279 all four switches of the timing device will be connected in parallel. In consequence initiation of operation of the power motor will be caused upon closure of each of the four switches of the timing device, which means that if such initiation is established, for example, every 6 minutes when only the timer switch 163 is connected in circuit, it will be established every 1½ minutes if all the four switches are connected in circuit.

In the modification diagrammatically shown by Fig. 22 the timing motor 153 drives at reduced speed a shaft 295 upon which are arranged four cams 297, 299, 301 and 303, each having a cam finger 161 for cooperation with the several timer switches 163, 165, 167 and 169, the several cam fingers 161 being arranged in quartering relation with each other so that, as heretofore, the switches will be consecutively operated by rotation of the timing motor. As shown, one of the terminals of each of the several timing switches is connected to the lead 255 by the several leads 305, 307, 309 and 311. The other terminal of the switch 165, as heretofore, is connected by a lead 277 to the contact point 279 of the selector switch, while the other two terminals of the switches 167 and 169 are connected, as heretofore, by the joined leads 285 and 287 to the other contact point 289 of the selector switch. By use of the selector switch, as heretofore, the timing switch 165 may be connected in circuit in parallel with the timer switch 163, or, as heretofore, the three switches 165, 167 and 169 may be connected in circuit all in parallel with the switch 163, so that the duration between initiations of operation of the power motor as controlled by the switch 183 may be halved or quartered.

No attempt has been made to show the actual wiring as applied to the embodiment of the machine shown in the drawings, as it is believed that those skilled in the art may readily supply such wiring by following the wiring diagram above described.

The inlet valve 69 and outlet valve 71 heretofore described are mounted for reciprocatory movement in longitudinally extending grooves 313 and 315, formed in the adjacent pairs of longitudinally extending horizontal bars 27 and 41, respectively, as clearly indicated in Figs. 8 and 12. As shown, the inlet valve 69 is provided at one end with an extension 317 in which is formed an elongated slot 319 (Figs. 7 and 12). On the shaft 109 which operates the cam for moving the basket is fixedly mounted a radially projecting arm 321. This shaft rotates counterclockwise, to move the arm upwardly, as viewed in Fig. 12. Such movement of the arm from its position shown in Fig. 12 to its position shown in Fig. 13 will cause the arm to enter the slot 319 of the inlet valve 69 and engage one end of the slot to move the valve to the left into its fully open position shown by Fig. 14, whereupon continued rotation of the arm causes it to move downwardly from the slot.

The inlet valve 69 is normally held in its closed position shown by Fig. 12 by a semi-circular cam 323 fixedly mounted upon the shaft 109 so as to rotate therewith. In the position shown by Fig. 12 the curved peripheral surface 325 of the cam rests against a finger 327 the lower end of which is pivotally mounted at 329 on a plate 331 resting upon the upper edges of the horizontal bars 41 and carried thereby (see Figs. 8 and 12). The valve 69 carries a roller 333, against which the upper portion of the finger 327 rests when the parts are in their position shown by Fig. 12, and against which roller the finger is held by the cam 323 so as to hold the valve closed. After the inlet valve 69 is opened, further rotation of the shaft 109 from its position shown by Fig. 14 will cause the cam 323 to engage with the finger 327 to cause the upper end of the finger to engage with the roller 333 and move the valve again into its closed position shown by Fig. 15.

As shown, the outlet valve 71 at opposite sides thereof is provided with rearwardly extending portions 335 and 337 (Figs. 7, 8 and 11). Also, as shown, pivoted at 339 to a plate 341, carried at the under sides of the pair of bars 41 and extending therebetween, is one end of a lever 343. The opposite end of this lever is slotted as shown at 345, and through the slot extends a headed pin 347 carried by and projecting upwardly from the extension 337 of the valve. Carried by and projecting upwardly from the opposite extension 335 of the valve is a second headed pin 349 extending through the longitudinally extending slot 351 at the end portion of a link 353, the opposite end of this link being pivotally connected at 355 to the lever 343 intermediate the length of the latter. Rearwardly of the shaft 109 is positioned a rock shaft 357 journalled at opposite ends in the plates 47 and 48 respectively. This rock shaft rigidly carries a hub 359 with which is integrally formed a pair of radially extending arms 361 and 363 spaced from each other longitudinally of the hub. When the shaft 109 is rotated into the position shown by Fig. 15 to close the inlet valve 69 the arm 321 rigid with that shaft engages the arm 363 on the rock shaft 357, continued downward movement of the arm 321, as viewed in Fig. 15, causing the rock shaft to rotate clockwise to swing the arm 363 operatively carried thereby to the right. The arm 361 normally rests against the adjacent edge of the link 353 and, as will be clear from Figs. 7 and 9, clockwise movement of it will cause it to press against the link 353 and swing that link and the lever 343 from their positions shown by Fig. 7 to their positions shown by Fig. 11, the arm 361 bearing against the lever 343 during the final part of such movement, as will be clear from Figs. 10 and 11. So moving the link and lever will move the valve 71 from its closed position shown by Fig. 15 to its open position shown by Fig. 16, whereupon the arm 321 moves from in contact with the arm 363 and continues to move downwardly, as viewed in Fig. 16, to engage with the lug 365 carried by the rearward end of the valve 71 to move the valve from its fully open position shown by Fig. 16 to its fully closed position shown by Fig. 12. As the arm 361 engages the link 353 and lever 343 adjacent the mid-point of the length of the latter it will be observed that the motion of the arm imparted to the valve 71 through the link and lever is multiplied, so that the construction described permits a compact arrangement of parts.

It will be understood that within the scope of the appended claims wide deviations may be made from the forms of the invention described without departing from the spirit of the invention.

I claim:

1. A cooking machine having, in combination, a container for hot cooking liquid, a basket for the articles to be cooked, power operated means for moving the basket relative to said container through a cycle which removes it from such liquid and then replaces it therein, an operator controlled variable timing device, and means controlled by said timing device for causing, at selected substantially regular intervals of greater duration than such cycle, said power operated means to so move said basket.

2. A cooking machine having, in combination, a container for hot cooking liquid, a basket for the articles to be cooked, power operated means for moving the basket relative to said container through cycles of substantially constant duration each of which removes the basket from such liquid and then replaces it therein, a timing device, means controlled by said timing device for causing at substantially regular intervals, each of duration greater than the duration of the cycle of movement of the basket, said power operated means to move said basket through one of such cycles, and operator controlled means for selectively varying the durations of the intervals between such cycles of movement of said basket by said power operated means.

3. A cooking machine having, in combination, a container for hot cooking liquid, a basket for the articles to be cooked, power operated means for moving the basket relative to said container through a cycle which removes it from such liquid and then replaces it therein, an operator controlled variable timing device comprising switch means operated at selected substantially regular intervals, and circuit means controlled by the operation of said switch means for causing at such substantially regular intervals said power operated means to so move said basket.

4. A cooking machine having, in combination, a container for hot cooking liquid, a basket for the articles to be cooked, power operated means for moving the basket relative to said container through a cycle which removes it from such liquid and then replaces it therein, a timing device comprising switch means operated at substantially regular intervals, circuit means controlled by the operation of said switch means for causing at such substantially regular intervals said power operated means to so move said basket, and operator controlled means for selectively varying the durations of the intervals between such movements of said basket by said power operated means.

5. A cooking machine having, in combination, a container for hot cooking liquid, a basket for the articles to be cooked, power operated means for moving the basket relative to said container through a cycle which removes it from such liquid and then replaces it therein, a continuously operated timing device comprising switch means operated at substantially regular intervals, circuit means controlled by the operation of said switch means for causing at such substantially regular intervals said power operated means to so move said basket, and operator controlled switch means associated with said circuit means for selectively varying the durations of the intervals between such movements of said basket by said power operated means.

6. A nut cooking machine having, in combination, a container for hot cooking liquid, a basket for the articles to be cooked, power operated means comprising a normally stationary electric driving motor for moving the basket relative to said container through a cycle which removes said basket from such liquid and then replaces it therein, a continuously operated operator controlled variable timing device comprising switch means operated at selected substantially regular intervals, and circuit means controlled by the operation of said switch means for causing at such substantially regular intervals said motor to operate for so moving said basket.

7. A nut cooking machine having, in combination, a container for hot cooking liquid, a basket for the articles to be cooked, power operated means comprising a normally stationary electric driving motor for moving the basket relative to said container through a cycle which removes said basket from such liquid and then replaces it therein, a continuously operated timing device comprising switch means operated at substantially regular intervals, circuit means controlled by the operation of said switch means for causing at such substantially regular intervals said motor to operate for so moving said basket, and operator controlled means for selectively varying the durations of the intervals between the operations of said motor.

8. A nut cooking machine having, in combination, a container for hot cooking liquid, a basket for the articles to be cooked, power operated means comprising a normally stationary electric driving motor for moving the basket relative to said container through a cycle which removes said basket from such liquid and then replaces it therein, a continuously operated timing device comprising switch means operated at substantially regular intervals, circuit means controlled by the operation of said switch means for causing at such substantially regular intervals said motor to operate for so moving said basket, and operator controlled switch means associated with said circuit means for selectively varying the durations of the intervals between the operations of said motor.

9. A cooking machine having, in combination, a container for hot cooking liquid, a basket for the articles to be cooked, power operated means comprising a normally stationary electric driving motor for moving the basket relative to said container through a cycle which removes said basket from such liquid and then replaces it therein, a continuously operated operator controlled variable timing device comprising switch means operated at selected substantially regular intervals, circuit means controlled by said switch means for initiating operation of said motor; and a holding switch means, operated by said motor, and circuit means controlled thereby for causing said motor when its operation is so initiated to continue operating until the basket is moved through said cycle and then to discontinue operating.

10. A cooking machine having, in combination, a container for hot cooking liquid, a basket for the articles to be cooked, power operated means comprising a normally stationary electric driving motor for moving the basket relative to said container through a cycle which removes said basket from such liquid and then replaces it therein, a continuously operated timing device comprising switch means operated at substantially regular intervals, circuit means controlled by said switch means for initiating operation of said motor; a holding switch means, operated by said motor, and circuit means controlled thereby for causing said motor when its operation is so initiated to continue operating until the basket is moved through said cycle and then to discontinue operating, and operator controlled switch means associated with the first mentioned circuit means for selectively varying the durations of the intervals between the initiations of operations of said motor.

11. A cooking machine having, in combination, a container for hot cooking liquid, a basket for the articles to be cooked, power operated means for moving the basket relative to said container through a cycle which removes it from such liquid and then replaces it therein, a timing device comprising a plurality of switch means consecutively operated, circuit means adapted to be controlled by each of said switch means for causing said power operated means intermittently to so move said basket, and operator controlled means associated with said circuit means for selectively varying the number of said switch means controlling said circuit means whereby selectively to vary the durations of the intervals between such movements of said basket by said power operated means.

12. A cooking machine having, in combination, a container for hot cooking liquid, a basket for the articles to be cooked, power operated means comprising a normally stationary electric driving motor for moving the basket relative to said container through a cycle which removes the basket from such liquid and then replaces it therein, a continuously operated timing device comprising a plurality of switch means consecutively continuously operated with substantially equal intervals between such operations, circuit means adapted to be controlled by each of said switch means for initiating operation of said motor, operator controlled switch means associated with said circuit means for selectively varying the number of said switch means controlling said circuit means whereby selectively to vary the durations of the intervals between the initiations of operations of said motor, and a holding switch device operated by said motor and circuit means controlled thereby for causing said motor when its operation is so initiated to continue operating until the basket is moved through said cycle and then to discontinue operating.

13. A cooking machine having, in combination, a container for hot cooking liquid, a basket for the articles to be cooked, means for charging the basket with such articles, power operated means for operating the last mentioned means and for moving said basket relative to said container through a cycle for raising the basket from such liquid and dumping it and then returning it to said liquid charged with fresh articles, an operator controlled variable timing device, and means controlled by said timing device for causing, at selected substantially regular intervals of greater duration than such cycle said power operated means to so move and charge said basket.

14. A cooking machine having, in combination, a container for hot cooking liquid, a basket for the articles to be cooked, means for charging the basket with such articles, mechanism comprising a normally stationary electric driving motor for operating the last mentioned means and for moving said basket relative to said container for raising the basket from such liquid and dumping it and then returning and charging it with fresh articles, a continuously operated operator controlled variable timing device comprising switch means operated at selected substantially regular intervals, circuit means controlled by said switch means for initiating operation of said motor when said switch means is operated, and circuit means comprising a second switch means controlled by said motor for causing continued operation of the motor until said basket is returned to the container by said mechanism.

15. A cooking machine having, in combination, a container for hot cooking liquid, a basket for the articles to be cooked, means for charging the basket with such articles, mechanism comprising a normally stationary electric driving motor for operating the last mentioned means and for moving said basket relative to said container for raising the basket from such liquid and dumping it and then returning and charging it with fresh articles, a continuously operated timing device comprising switch means operated at substantially regular intervals, circuit means controlled by said switch means for initiating operation of said motor when said switch means is operated, circuit means comprising a second switch means controlled by said motor for causing continued operation of the motor until said basket is returned to the container by said mechanism, and operator controlled switch means associated with the first mentioned circuit means for selectively varying the durations of the intervals between the initiations of operations of said motor.

16. A cooking machine, a container for cooking liquid, a heater for said liquid, a basket for the articles to be cooked, power operated mechanism for operating said basket, an operator controlled variable timing device for causing operation of said basket by said mechanism at selected substantially regular intervals, and thermostatic means responsive to the temperature of the cooking liquid for rendering said timing device inoperative when such temperature is less than a predetermined minimum.

17. A cooking machine having, in combination, a basket mounted for swinging movement for dumping its contents, an oscillatory lever and a link operatively connecting it to said basket for so swinging it, a rotary cam having a peripheral cam surface, said lever operatively having a laterally projecting portion engaged by said cam surface for causing rotation of said cam to move said lever during that part of its travel in which the weight of the basket urges said portion against said cam surface, and means rotatable with said cam presenting a cam surface adapted to engage said portion for causing movement of said lever during that part of its travel in which the weight of the basket urges said portion away from said first mentioned cam surface.

18. A cooking machine having, in combination, a hopper for the articles to be cooked; means for discharging from said hopper measured quantities of such articles comprising a measuring chamber; a sliding inlet valve for controlling entrance of such articles to said chamber from said hopper; a sliding outlet valve for controlling discharge of such articles from said chamber; mechanism for alternately reciprocating said valves comprising a rotary shaft, a separately mounted rockable member, and a motion multiplying lever means operated by said rockable member; and means, independent of said rockable member and motion multiplying lever means, carried by said shaft for, during one revolution thereof, opening and closing said inlet valve and thereafter, during the same revolution, closing said outlet valve and prior to closing said outlet valve, but after closing said inlet valve, operating said rockable member for causing the latter to operate said motion multiplying lever means for quickly opening said outlet valve.

19. A cooking machine according to claim 18 in which the means carried by the shaft comprises a projecting arm for operatively successively engaging the valves for opening the inlet valve and closing the outlet valve, a cam on said shaft, and means operated by said cam for closing said inlet valve after it has been opened by said arm.

20. A cooking machine according to claim 18 in which the motion multiplying lever means for quickly opening the outlet valve comprises a lever operatively connected at one end portion thereof to said valve adjacent one lateral side of the latter, the other end portion of which lever is pivoted at a fixed point positioned toward the opposite lateral side of said valve, a link pivoted at one end portion thereof to said lever intermediate the length of the latter and at its opposite end portion operatively pivotally connected to said valve at the lateral side of said valve opposite the pivotal connection of said lever thereto, the rockable member operating on said lever and link adjacent the pivotal connection of one to the other for quickly opening said valve.

LESLIE W. CURRIER, Jr.

REFERENCES CITED

The following references are of record in the file of this patent:

UNITED STATES PATENTS

| Number | Name | Date |
| --- | --- | --- |
| 1,760,600 | Lockett | May 27, 1930 |
| 2,004,500 | Brunelle | June 11, 1935 |
| 2,222,314 | Husk | Nov. 19, 1940 |
| 2,385,644 | Polk | Sept. 25, 1945 |